(12) United States Patent
Humfeld

(10) Patent No.: US 8,647,548 B1
(45) Date of Patent: Feb. 11, 2014

(54) METHOD AND SYSTEM TO REDUCE POROSITY IN COMPOSITE STRUCTURES

(75) Inventor: Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/602,096

(22) Filed: Aug. 31, 2012

(51) Int. Cl.
*B29C 70/04* (2006.01)

(52) U.S. Cl.
USPC .......................................... 264/137; 264/258

(58) Field of Classification Search
USPC .................................................. 264/258, 137
See application file for complete search history.

(56) References Cited

U.S. PATENT DOCUMENTS

| | | | | |
|---|---|---|---|---|
| 3,408,315 | A | * | 10/1968 | Paine ............................... 264/49 |
| 3,520,960 | A | * | 7/1970 | Douglas ........................... 264/49 |
| 4,588,633 | A | * | 5/1986 | Kono et al. .................... 428/220 |
| 4,690,836 | A | * | 9/1987 | Clarke et al. .................. 427/299 |
| 4,898,754 | A | * | 2/1990 | Christensen et al. ......... 427/369 |
| 4,906,711 | A | * | 3/1990 | Markovitz .................... 525/504 |
| 5,300,176 | A | * | 4/1994 | Tanikella ...................... 156/286 |
| 5,645,925 | A | * | 7/1997 | Sheppard et al. ............. 442/128 |
| 6,009,635 | A | * | 1/2000 | Vidaurre et al. .................. 34/92 |

OTHER PUBLICATIONS

Mailer, Rod, "Chemistry and Quality of Olive Oil", Primefact 227, Published by NSW Dept. of Primary Industries, State of New South Wales, Aug. 2006, 4 pages.
Wikipedia, "Higher Alkanes",from Internet website at web address <http://en.wikipedia.org/wiki/Higher_alkanes>, as of Aug. 31, 2012, 4 pages.

* cited by examiner

*Primary Examiner* — Matthew Daniels

(57) ABSTRACT

In an embodiment of the disclosure, there is provided a method to reduce porosity in a composite structure. The method adds an additive to a resin material to form an additive-resin mixture. The method combines the additive-resin mixture with reinforcement fibers to form a composite prepreg material, and in turn, a composite structure. The method heat cures the composite structure in a heating apparatus under a vacuum device at the resin cure temperature, heats the composite structure to an increased temperature above the additive phase transition temperature, and maintains the increased temperature for a time period sufficient. The method reduces the increased temperature back down to the resin cure temperature to allow the additive gas to undergo a phase transition to a condense phase, resulting in a substantially reduced vacuum pressure, resulting in a reduction in a porosity of the composite structure.

13 Claims, 5 Drawing Sheets

METHOD AND SYSTEM TO REDUCE POROSITY IN COMPOSITE STRUCTURES

BACKGROUND

1) Field of the Disclosure

The disclosure relates generally to composite structures, and more particularly, to methods and systems for reducing porosity in composite structures, such as composite parts for aircraft.

2) Description of Related Art

Composite materials, such as carbon fiber-reinforced polymer (CFRP) materials, are used in the manufacture of a wide variety of structures and component parts due to their high strength and rigidity, low weight, corrosion resistance, and other favorable properties. In particular, in the manufacture of aircraft, CFRP composite structures and component parts are used in increasing quantities to form the fuselage, wings, tail sections, skin panels, and other component parts of the aircraft.

During the manufacture of CFRP composite structures, unwanted voids, or empty areas, in the composite material may be created due to issues in a manufacturing process or engineering design. For example, before the cure cycle of a CFRP composite structure, such voids may be created by air entrapped during a layup operation. In addition, for example, during the cure cycle of the CFRP composite structure, such voids may be created by expansion of entrapped air and/or volatiles such as absorbed moisture and gaseous reaction products.

Porosity is a measure, e.g., a percentage, of the void content in a material and is a fraction of the volume of voids over the total volume. Void mitigation and low porosity levels or low void content, e.g., less than 2%-5%, are desirable to achieve good mechanical properties, such as shear strength, and to ensure the performance of the composite structures.

In addition, during the manufacture of large composite parts, such large composite parts may typically undergo many hours, e.g., 12-24 hours or more, of a pre-cure vacuum hold under vacuum pressure, in order to remove or substantially remove air that may be entrapped between the layers of composite material. Such pre-cure vacuum hold may add significant time to the overall manufacturing process, thus increasing the overall cost of manufacturing large composite parts.

Accordingly, there is a need in the art for an improved method and system for reducing porosity in composite structures that provide advantages over known methods and systems.

SUMMARY

This need for an improved method and system for reducing porosity in composite structures is satisfied. As discussed in the below detailed description, embodiments of the improved method and system for reducing porosity in composite structures may provide significant advantages over known methods and systems.

In an embodiment of the disclosure, there is provided a method to reduce a porosity in a composite structure. The method comprises adding an additive to a resin material to form an additive-resin mixture. The additive comprises a phase transition material having an additive phase transition temperature greater than a resin cure temperature of the resin material. The method further comprises combining the additive-resin mixture with a plurality of reinforcement fibers to form a composite prepreg material. The method further comprises forming the composite prepreg material into a composite structure. The method further comprises heat curing the composite structure in a heating apparatus under a vacuum device at an effective vacuum pressure for an effective time period at the resin cure temperature sufficient to decrease a viscosity of the resin material. The method further comprises heating the composite structure to an increased temperature above the additive phase transition temperature and above the resin cure temperature, and maintaining the increased temperature for a time period sufficient for the additive to undergo a phase transition and to form an additive gas that substantially displaces one or more gases out of the composite structure. The method further comprises reducing the increased temperature back down to the resin cure temperature to allow the additive gas to undergo a phase transition to a condensed phase, resulting in a substantially reduced vacuum pressure in the composite structure, and resulting in a reduction in a porosity of the composite structure. The method further comprises cooling the composite structure.

In another embodiment of the disclosure, there is provided a method to reduce a porosity in an aircraft composite part. The method comprises adding an additive to a resin material to form an additive-resin mixture. The additive comprises a phase transition material having an additive phase transition temperature greater than a resin cure temperature of the resin material. The method further comprises combining the additive-resin mixture with a plurality of reinforcement carbon fibers to form a composite prepreg material. The method further comprises laying up the composite prepreg material via a forming process comprising a manual layup or an automated layup. The method further comprises surrounding the aircraft composite part under a vacuum bag under a vacuum pressure. The method further comprises heat curing in a heating apparatus comprising an autoclave or an oven, the aircraft composite part surrounded under the vacuum bag at an effective vacuum pressure, for an effective time period to the resin cure temperature sufficient to decrease a viscosity of the resin material. The method further comprises maintaining the resin cure temperature for an effective resin cure time period. The method further comprises heating the aircraft composite part to an increased temperature in a range of from about 5 degrees Fahrenheit to about 20 degrees Fahrenheit above the additive phase transition temperature and above the resin cure temperature. The method further comprises maintaining the increased temperature for a time period sufficient for the additive to undergo a liquid to gas phase transition and to form an additive gas that substantially displaces one or more gases out of the aircraft composite part. The method further comprises reducing the increased temperature back down to the resin cure temperature to allow the additive gas to undergo a phase transition to a condensed phase, resulting in a substantially reduced vacuum pressure in the aircraft composite part, and resulting in a reduction in a porosity of the aircraft composite part in a range of from about 80% to about 99% porosity reduction. The method further comprises cooling the aircraft composite part. The method further comprises removing the cooled aircraft composite part out of the autoclave.

In another embodiment of the disclosure, there is provided a system for reducing a porosity in a composite structure. The system comprises a composite prepreg material. The composite prepreg material comprises a plurality of reinforcement fibers preimpregnated with an additive-resin mixture. An additive of the additive-resin mixture comprises a phase transition material having an additive phase transition temperature greater than a resin cure temperature of the resin material. The system further comprises a forming apparatus comprising a layup machine adapted to layup the composite prepreg material into a composite structure. The system further comprises a vacuum device comprising a vacuum bag. The vacuum device is adapted to surround the composite structure under a vacuum at an effective vacuum pressure. The system further comprises a heating apparatus comprising an autoclave and an oven. The heating apparatus is adapted to heat cure the composite structure surrounded by the vacuum device to an effective resin cure temperature and to maintain the resin cure temperature for an effective time period sufficient to decrease a viscosity of the resin material. The heating apparatus is further adapted to heat the composite structure to an increased temperature above the additive phase transition temperature and above the resin cure temperature and to maintain the increased temperature for a time period sufficient for the additive to undergo a liquid to gas phase transition and to form an additive gas that substantially displaces one or more gases out of the composite structure. The heating apparatus is further adapted to reduce the increased temperature back down to the resin cure temperature to allow the additive gas to undergo a phase transition to a condensed phase, resulting in a substantially reduced vacuum pressure in the composite structure, and resulting in a reduction in a porosity of the composite structure.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
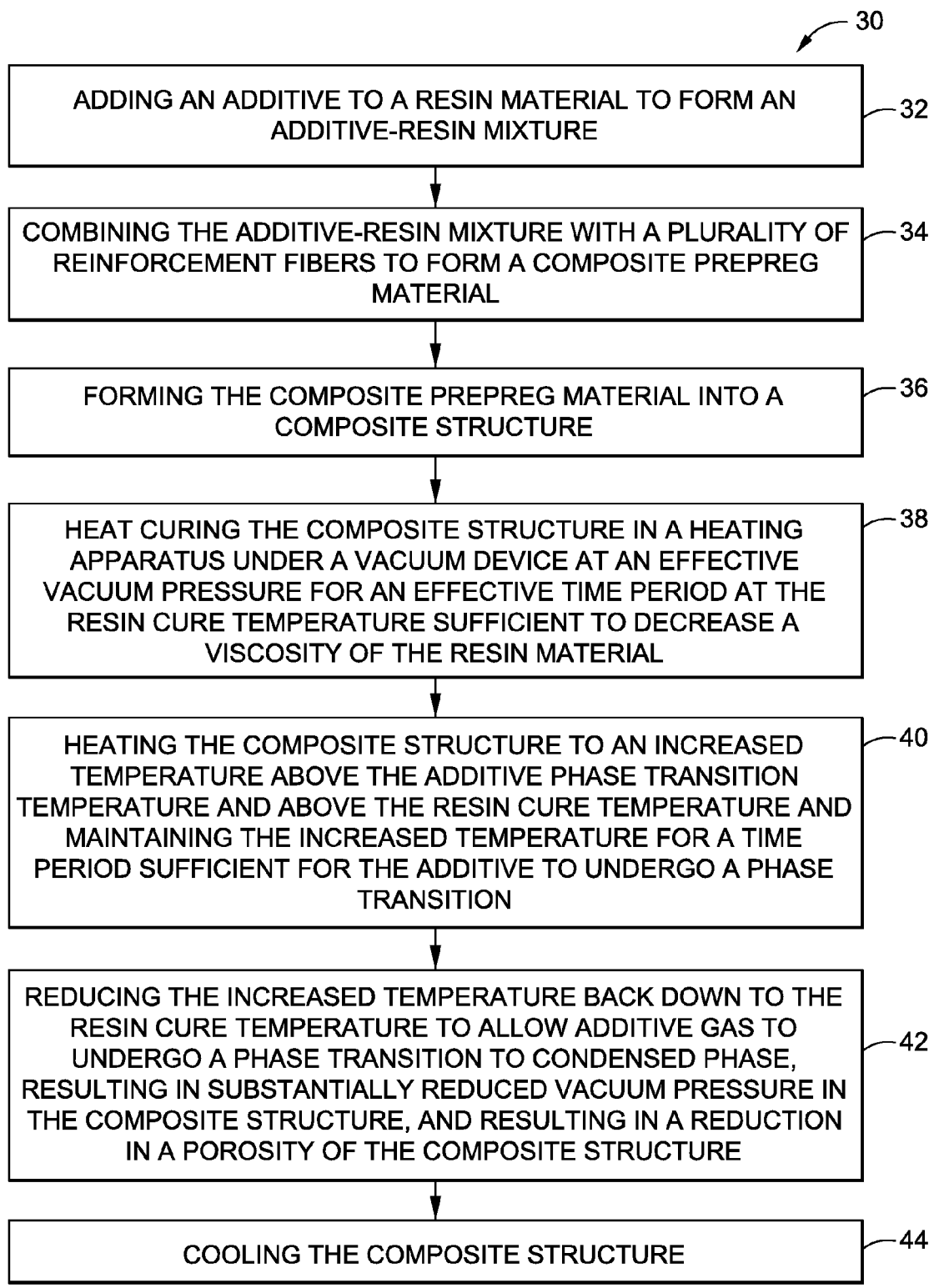
FIG. 1 is an illustration of a flow diagram of one of the embodiments of a method of the disclosure.
Figure 2A:
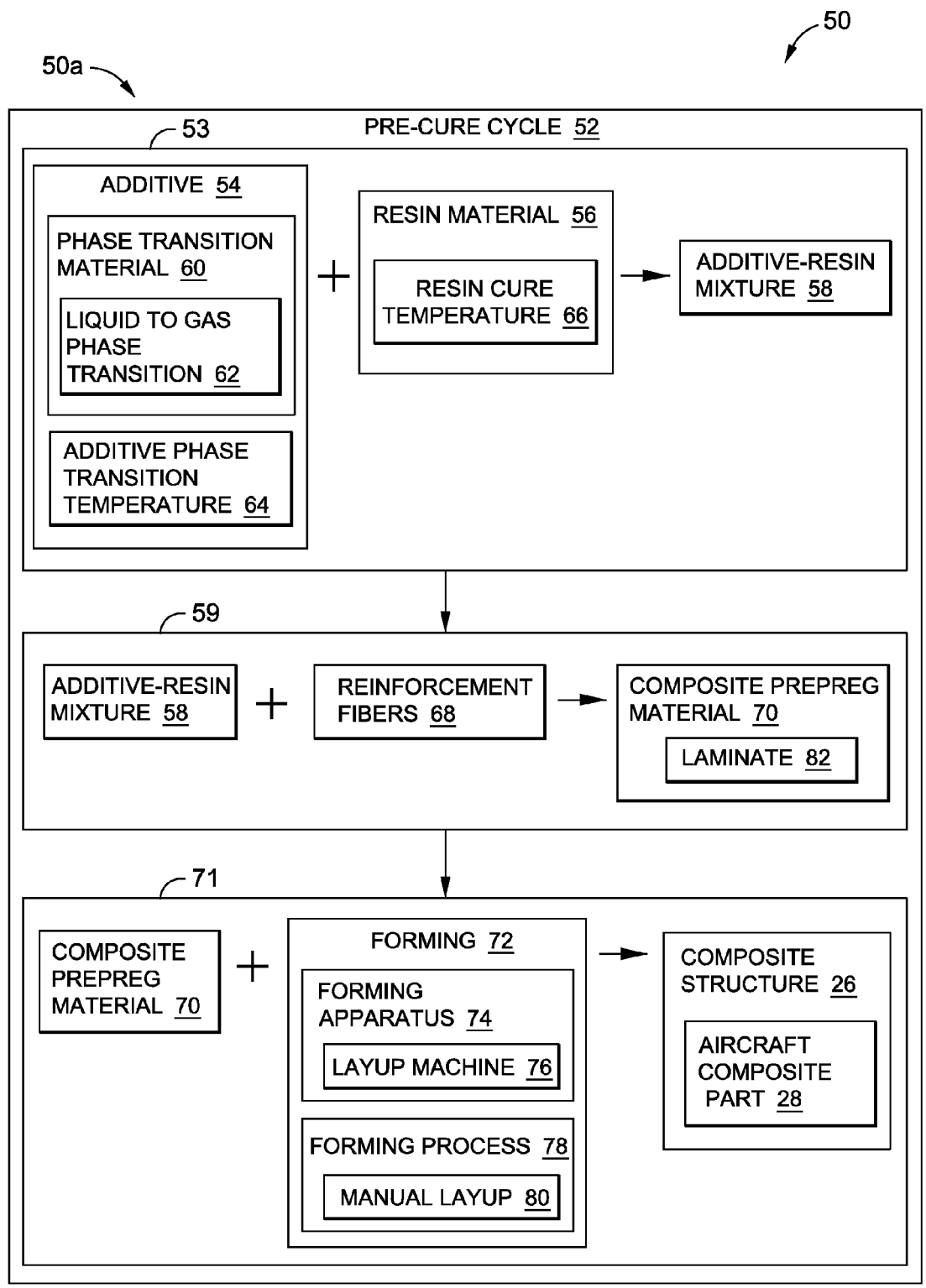
FIG. 2A is an illustration of a block diagram of one of the embodiments of a system of the disclosure showing a system portion in the form of a pre-cure cycle.
Figure 2B:
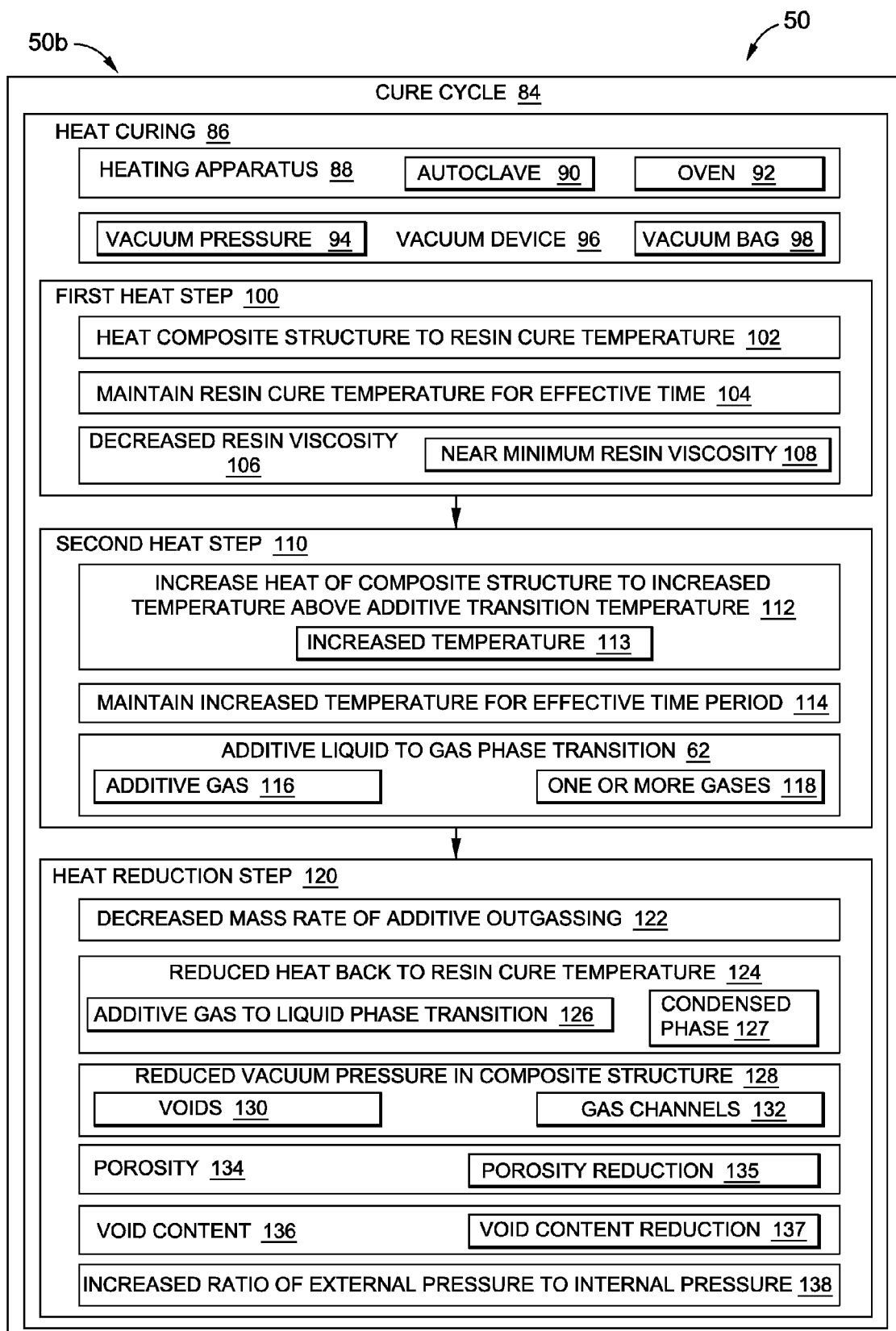
FIG. 2B is an illustration of a block diagram of one of the embodiments of a system of the disclosure showing a system portion in the form of a cure cycle; and, FIG. 2C is an illustration of a block diagram of one of the embodiments of a system of the disclosure showing a system portion in the form of a post-cure cycle; and, FIG. 3 is an illustration of a perspective view of an exemplary aircraft that may incorporate a composite structure made by one of the embodiments of a method of the disclosure.
Figure 2C:
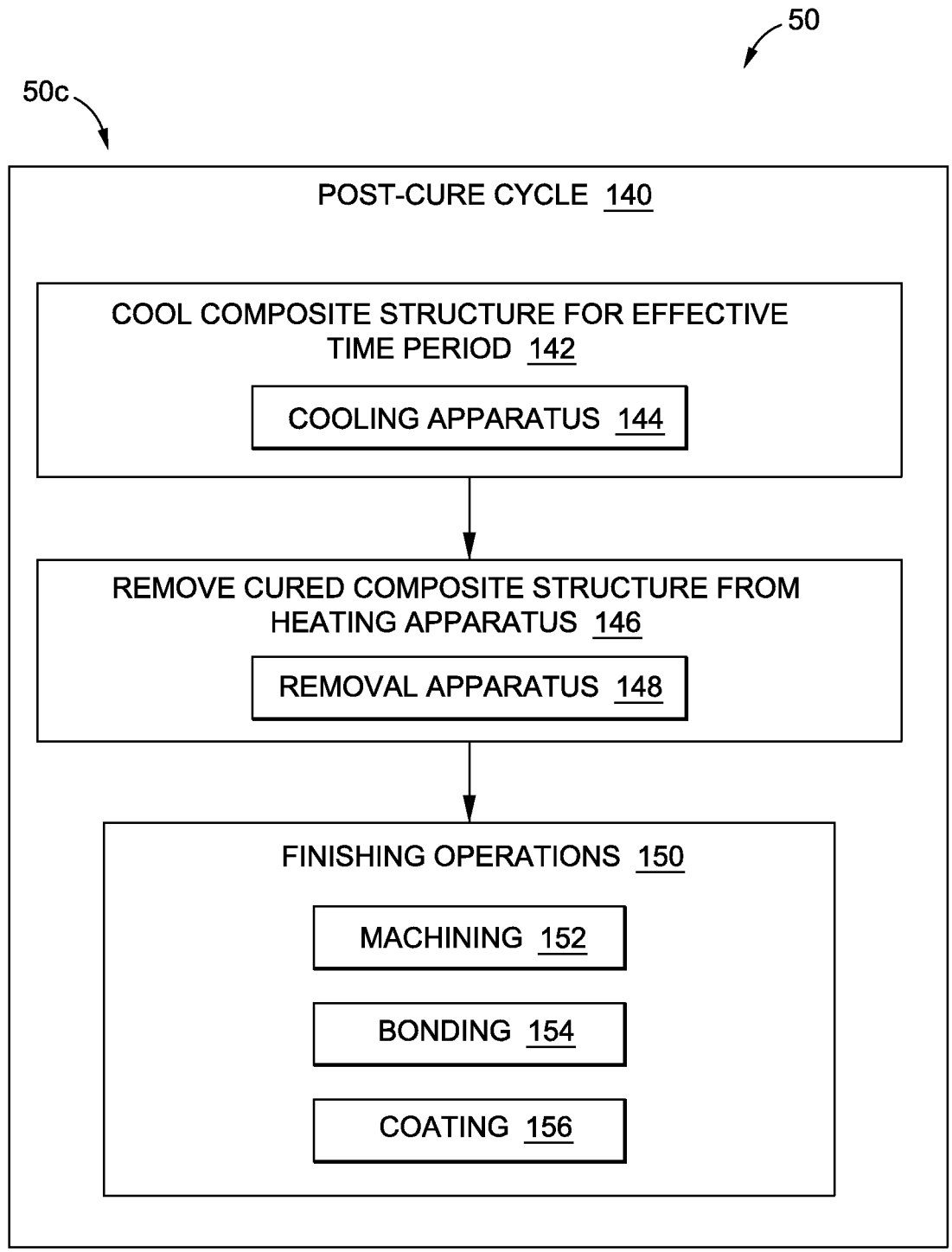

Now referring to the Figures, FIG. 1 is an illustration of a flow diagram of an exemplary embodiment of a method 30 to reduce porosity 134 (see FIG. 2B) in a composite structure 26 (see FIG. 2A). FIG. 2A is an illustration of a block diagram of one of the embodiments of a system 50 of the disclosure showing a system portion 50a in the form of a pre-cure cycle 52. FIG. 2B is an illustration of a block diagram of one of the embodiments of a system 50 of the disclosure showing a system portion 50b in the form of a cure cycle 84. FIG. 2C is an illustration of a block diagram of one of the embodiments of a system 50 of the disclosure showing a system portion 50c in the form of a post-cure cycle 140.

As shown in FIG. 1 and FIG. 2A, the method 30 comprises step 32 of adding an additive 54 (see FIG. 2A) to a resin material 56 (see FIG. 2A) to form an additive-resin mixture 58 (see FIG. 2A). As shown in FIG. 2A, the system 50 comprises the system portion 50a in the form of the pre-cure cycle 52. As further shown in FIG. 2A, the pre-cure cycle 52 comprises an additive-resin mixture preparation portion 53, where the additive-resin mixture 58 is prepared by mixing the additive 54 and the resin material 56 together. As further shown in FIG. 2A, the additive 54 comprises a phase transition material 60 having an additive phase transition temperature 64. For the method 30 and system 50, the additive phase transition temperature 64 is greater than a resin cure temperature 66 of the resin material 56.

For purposes of this application, the "additive phase transition temperature" means the temperature at which the additive changes from one phase or state of matter to another phase or state of matter, for example, the temperature at which the additive changes from a liquid to a gas, a gas to a liquid, a solid to a gas, or a gas to a solid. Preferably, the additive 54 comprises a phase transition material 60 that is reversible and undergoes an additive liquid to gas phase transition 62 (see FIG. 2B) and an additive gas to liquid phase transition 126 (see FIG. 2B) during the cure cycle 84 of the method 30 and the system 50.

The step 32 of the method 30 of adding the additive 54 (see FIG. 2A) to the resin material 56 (see FIG. 2A) further comprises adding an additive 54 that includes one or more of the following: alkanes having nine or more carbon atoms with a boiling point (bp) at 1 (one) atmosphere pressure at a temperature in a range of from about 250° F.-950° F. (degrees Fahrenheit)/394K-783K (Kelvin)/121° C.-510° C. (degrees Celsius), and more preferably, at a temperature in a range of from about 303° F.-914° F./424K-763K/151° C.-490° C.; phenylpropenes with a boiling point (bp) at one (1) atmosphere pressure at a temperature in a range of from about 392° F.-500° F./473K-533K/200° C.-260° C.; polycyclic aromatic hydrocarbons with a boiling point (bp) at one (1) atmosphere pressure at a temperature in a range of from about 422° F.-980° F./490K-800K/217° C.-527° C.; triglyceride with both alkenyl and alkyl groups such as triacylglycerides (three (3) fatty acids attached to a glycerol base), a type of glycerolipid, for example, (E)-4-hydroxyphenethyl 4-formyl-3-(2-oxoethyl)hex-4-enoate (olive oil), which has a boiling point (bp) at 1 (one) atmosphere pressure of about 355° F./452K/179° C.; or another suitable additive.

Lowering pressure lowers boiling point, and the method 30 and system 50 may preferably be operating at pressures below 0.2 atmosphere and temperatures near 355° F./453K/180° C. The boiling point means the temperature at which the vapor pressure of a liquid equals the pressure surrounding the liquid and the liquid changes into a vapor. A liquid in a vacuum has a lower boiling point than when that liquid is at atmospheric pressure. A liquid at high-pressure has a higher boiling point than when that liquid is at atmospheric pressure. The boiling point of a liquid varies depending upon the surrounding environmental pressure. For a given pressure, different liquids may boil at different temperatures.

Preferred alkanes having nine or more carbon atoms may include nonane ($C_9H_{20}$), decane, undecane, dodecane, tridecane, tetradecane, pentadecane, hexadecane, heptadecane, octadecane, nonadecane, icosane, henicosane, docosane, tricosane, tetracosane, pentacosane, hexacosane, heptacosane, octacosane, nonacosane, triacontane, hentriacontane, dotriacontane, tritriacontane, tetratriacontane, pentatriacontane, hexatriacontane, heptatriacontane, octatriacontane, nonatriacontane, tetracontane, hentetracontane, and dotetracontane ($C_{42}H_{86}$). For example, tetradecane has a boiling point at one (1) atmosphere pressure at a temperature of about 482° F./523K/250° C. and has a boiling point at 0.013 atmosphere pressure at a temperature of about 251° F./395K/122° C. Thus, the preferred boiling point for tetradecane is at a temperature in an atmospheric pressure range of from about 0.013 atmosphere to about 1 atmosphere.

Preferred phenylpropenes may include eugenol that has a boiling point at one (1) atmosphere pressure at a temperature of about 491° F./528K/255° C.; chavicol that has a boiling point at one (1) atmosphere pressure at a temperature of about 460° F./511K/238° C.; safrole that has a boiling point at one (1) atmosphere pressure at a temperature of about 451° F./506K/233° C.; and estragole that has a boiling point at one (1) atmosphere pressure at a temperature of about 421° F./489K/216° C. The more preferred phenylpropene is eugenol.

Polycyclic aromatic hydrocarbons, as discussed above, have boiling points at one (1) atmosphere pressure at a temperature range of from about 422° F.-980° F./490K-800K/217° C.-527° C. Thus, preferred polycyclic aromatic hydrocarbons may have boiling points at temperatures in this range at 0.2 atmosphere pressure. Some preferred polycyclic aromatic hydrocarbons may include pentacene that sublimates at 702° F./605K/372° C. at one (1) atmosphere pressure; triphenylene having a boiling point of 820° F./711K/438° C. at one (1) atmosphere pressure; and phenanthrene having a boiling point of 630° F./605K/332° C. at one (1) atmosphere pressure. Some of the polycyclic aromatic hydrocarbons may be solid at room temperature, which may affect processing. The preferred polycyclic aromatic hydrocarbons are functional, yet are not designed to be incorporated into a composite structure that could expose any living organisms to possible detriment.

Preferably, the additive used in the method 30 and system 50 disclosed herein is added in an amount of from about 0.01 volume percent to about 1.5 volume percent, based on a total volume of the additive-resin mixture. More preferably, the additive is added in an amount of about 1.0 volume percent, based on a total volume of the additive-resin mixture.

The step 32 of the method 30 of adding the additive 54 (see FIG. 2A) to the resin material 56 (see FIG. 2A) further comprises adding the additive 54 to a resin material 56 that includes one or more of epoxy resins, epoxy amine resins, polyimide resins such as bismaleimide resins or other suitable polyimide resins, phenolic resins, silicone resins, a combination thereof, or another suitable resin material. Preferably, the resin material 56 is a thermoset material. Preferably, the resin material 56 has a resin cure temperature at a temperature in a range of from about 212° F.-950° F./373K-783K/100° C.-510° C. More preferably, the resin material has a resin cure temperature at a temperature in a range of from about 248° F.-410° F./393K-483K/120° C.-210° C. Most preferably, the resin material has a resin cure temperature at a temperature in a range of from about 248° F.-356° F./393K-453K/120° C.-180° C.

As shown in FIG. 1, the method 30 further comprises step 34 of combining the additive-resin mixture 58 (see FIG. 2A) with a plurality of reinforcement fibers 68 (see FIG. 2A) to form a composite prepreg material 70 (see FIG. 2A). As shown in FIG. 2A, the pre-cure cycle 52 further comprises a composite prepreg material preparation portion 59, where the composite prepreg material 70 is prepared by combining the additive-resin mixture 58 with the plurality of reinforcement fibers 68. Preferably, the plurality of reinforcement fibers 68 are preimpregnated with the uncured additive-resin mixture 58 using equipment and processes known in the art for making prepreg materials. The reinforcement fibers 68 may preferably comprise carbon fibers, carbon-based fibers such as a graphite fibers, aramid fibers, fiberglass fibers, glass fibers, KEVLAR fibers (KEVLAR is a registered trademark of E.I. Du Pont De Nemours and Company Corporation of Wilmington, Del.), a combination thereof, or other suitable carbon or non-carbon fibers. The composite prepreg material 70 may comprise the reinforcement fibers 68 in unidirectional (aligned) or fabric (woven) form, impregnated to a desired amount with the additive-resin mixture 58 or matrix. Preferably, the composite prepreg material 70 is in the form of a laminate 82 (see FIG. 2A), such as a laminate sheet. However, the composite prepreg material 70 may also be in the form of a tape or another suitable form. The additive-resin mixture 58 or matrix preferably transfers stresses between the reinforcement fibers 68 and thus protects the reinforcement fibers 68 from mechanical and/or environmental stresses.

As shown in FIG. 1, the method 30 further comprises step 36 of forming the composite prepreg material 70 (see FIG. 2A) into a composite structure 26 (see FIG. 2A). As shown in FIG. 2A, the pre-cure cycle 52 further comprises a composite structure formation portion 71, where the composite structure 26 is formed or prepared by forming 72 the composite prepreg material 70. The forming 72 may comprise forming or shaping the composite prepreg material 70 with a forming apparatus 74 (see FIG. 2A), such as in the form of a layup machine 76 (see FIG. 2A). For example, automated tape layup machines known in the art may be used for a shortened assembly time. The forming 72 may comprise forming or shaping the uncured composite prepreg material 70 with a forming process 78 (see FIG. 2A), such as in the form of a manual layup process 80 (see FIG. 2A), or an automated layup process with the layup machine 76. The process of layup, either by machine or manually, involves placing the uncured composite prepreg material 70, such as in the form of laminate sheets, onto the surface of a shaped mold or tool (not shown) which may be treated with a release agent or film (not shown). Multiple layers of the composite prepreg material 70 may be applied one on top of the other until a desired thickness is achieved and desired orientation of the reinforcement fibers is achieved for maximum strength and efficiency.

Unlike various known composite manufacturing processes, after the forming of the composite prepreg material 70 into the composite structure 26, the composite structure 26 preferably does not require a pre-cure vacuum hold under a vacuum pressure, and in particular, does not require a pre-cure vacuum hold under a vacuum pressure for large composite structures 26, such as large aircraft composite parts 28 or other suitable composite structures. Thus, the method 30 of the disclosure preferably avoids an additional 12-24 hours, or longer, for holding the composite structure 26 under a pre-cure vacuum hold. This, in turn, may decrease the overall time and cost for manufacturing of the composite structure 26.

As shown in FIG. 1 and FIG. 2B, the method 30 further comprises step 38 of heat curing 86 (see FIG. 2B) the composite structure 26 in a heating apparatus 88 (see FIG. 2B) under a vacuum device 96 (see FIG. 2B) at an effective vacuum pressure 94 (see FIG. 2B) for an effective time period at the resin cure temperature 66 (see FIG. 2A) sufficient to decrease a viscosity of the resin material 56 (see FIG. 2A). As shown in FIG. 2B, the system 50 comprises the system portion 50b in the form of the cure cycle 84. The cure cycle 84 comprises the heat curing 86 of the composite structure 26.

As further shown in FIG. 2B, the heat curing 84 includes using the heating apparatus 88, preferably in the form of an autoclave 90 or an oven 92. As further shown in FIG. 2B, the heat curing 84 includes the vacuum device 96, preferably in the form of a vacuum bag 98, and having an effective vacuum pressure 94. Preferably, the composite structure 26 is surrounded or covered by the vacuum bag 98, which is typically a hermetically sealed flexible vacuum bag, and a vacuum is applied in the vacuum bag 98. The process of surrounding the composite structure 26 under the vacuum bag 98 is known in the art as "vacuum bagging". The vacuum bag 98 may then be subjected to high temperature and vacuum pressure while maintaining a vacuum to cure the composite structure 26. Preferably, an autoclave 90 (see FIG. 2B) or an oven 92 (see FIG. 2B), such as a convection oven, may be used to apply the needed temperature and pressure to produce the composite structure 26. The composite structure 26 surrounded or covered by the vacuum bag 98 may be placed inside the autoclave 90 or the oven 92. The heat curing 86 is conducted within the autoclave 90 or the oven 92, thus obtaining not only the vacuum pressure 94 inside the autoclave 90 or the oven 92, but also obtaining an external pressure inside the autoclave 90 or the oven 92. The vacuum pressure and external pressure forces together or consolidates the layers of the composite prepreg material 70 that make up the composite structure 26.

As further shown in FIG. 2B, the cure cycle 84 comprises a first heat step 100. The first heat step 100 comprises heat 102 the composite structure 26 to the resin cure temperature 66. The resin cure temperature 66 used depends on which resin material 56 is used. The temperature may be increased or ramped up, such as from room temperature or ambient temperature, or a lower temperature, up to the desired resin cure temperature 66 at a rate in a range of from about 1° F. to about 10° F. (degrees Fahrenheit) per minute. This temperature increase or ramping up may be conducted preferably at a time period in a range of from about thirty (30) minutes to about ninety (90) minutes, or longer, depending on the resin cure temperature 66 to be achieved.

Once the composite structure 26 is heated to the resin cure temperature 66, the first heat step 100 further comprises maintain 104 or hold the resin cure temperature 66 for an effective time period. The effective time period may preferably be in a range of from about two (2) hours to about four (4) hours, in order that the coolest location of the composite structure 26 may heat to the resin cure temperature 66, since the composite structure 26 may have warmer locations that warm faster than cooler locations. For larger composite structures 26, the resin cure temperature 66 may need to be maintained or held longer than four (4) hours, depending on the temperature difference between the warmer locations on the composite structure 26 and the coolest location on the composite structure 26.

During the maintain 104 or hold of the resin cure temperature 66 during the cure cycle 84, when the resin material 56 has a decreased resin viscosity 106 (see FIG. 2B) that is at a near minimum resin viscosity 108, such that the resin material 56 has not yet gelled, the cure cycle 84 comprises a second heat step 110. As shown in FIG. 1 and FIG. 2B, the method 30 further comprises step 40 of heating the composite structure 26 to the additive phase transition temperature 64 above the resin cure temperature 66 for a time period sufficient for the additive 54 to undergo a phase transition, such as an additive liquid to gas phase transition 62, and to form an additive gas 116 (see FIG. 2B) that substantially displaces one or more gases 118 (see FIG. 2B) out of the composite structure 26.

As further shown in FIG. 2B, the cure cycle 84 comprises the second heat step 110. The second heat step 110 comprises step 112 of increase heat of the composite structure 26 to an increased temperature 113 (see FIG. 2B) above the additive phase transition temperature 64. The additive phase transition temperature 64 used depends on which additive 54 is used. The increased temperature 113 may comprise a temperature in a range of from about 5° F. (degrees Fahrenheit) to about 20° F. above the resin cure temperature 66, and preferably, about 5° F.-10° F., above the additive phase transition temperature 64, and more preferably about 5° F. above the additive phase transition temperature 64. The second heat step 110 further comprises step 114 of maintain the increased temperature 113 for an effective time period in a range of from about one (1) minute to about fifteen (15), depending on the additive 54 and additive phase transition temperature 64 used.

As further shown in FIG. 1, the method 30 further comprises step 40 of heating the composite structure 26 (see FIG. 2A) to an increased temperature 113 (see FIG. 2B) above the additive phase transition temperature 64 (see FIG. 2A) and above the resin cure temperature 66 (see FIG. 2A), and maintaining the increased temperature 113 for a time period sufficient for the additive 54 to undergo a phase transition, such as an additive liquid to gas phase transition 62 (see FIG. 2B), and to form an additive gas 116 (see FIG. 2B) that substantially displaces one or more gases 118 (see FIG. 2B) out of the composite structure 26. The one or more gases 118 may comprise existing entrapped air and volatiles, including absorbed moisture, dissolved water, resin outgases or another resin by-product, gaseous reaction products, or other suitable gases. Preferably, the heating the composite structure 26 to the increased temperature 113 above the additive phase transition temperature 64 further comprises maintaining the increased temperature for a time period 114 (see FIG. 2B) in a range of from about one (1) minute to about fifteen (15) minutes. Preferably, the heating of the composite structure 26 to the increased temperature 113 above the additive phase transition temperature 64 further comprises heating the composite structure 26 to an increased temperature 113 in a range of from about 5 degrees Fahrenheit to about 20 degrees Fahrenheit above the resin cure temperature 66, and preferably, about 5° F.-10° F. above the additive phase transition temperature 64, and more preferably about 5° F. above the additive phase transition temperature 64.

As further shown in FIG. 1, the method 30 further comprises step 42 of reducing the increased temperature 113 (see FIG. 2B) back down to the resin cure temperature 66 to allow the additive gas 116 to undergo a phase transition to a condensed phase 127 (see FIG. 2B), resulting in a substantially reduced vacuum pressure 94 (see FIG. 2B) in the composite structure 26, and resulting in a reduction in porosity 134 (see FIG. 2B) of the composite structure 26. Preferably, reducing the increased temperature 113 back down to the resin cure temperature to allow the additive gas 116 to undergo a phase transition to a condensed phase 127 (see FIG. 2B), resulting in a substantially reduced the vacuum pressure 94 in the composite structure 26 results in a percent porosity reduction 135 (see FIG. 2B) of the composite structure 26 in a range of from about 80% to about 99% porosity reduction 135. Preferably, the method 30 produces a composite structure 26, such as an aircraft composite part 28, having a low porosity, such as less than 2% porosity.

The method 30 further comprises step 44 of cooling the composite structure 26. As shown in FIG. 2C, the system 50 comprises a system portion 50c comprising a post-cure cycle 140. As shown in FIG. 2C, the post-cure cycle 140 comprises step 142 of cool composite structure 26 for an effective time period. The composite structure 26 may cool down on its own or with a cooling apparatus 144 (see FIG. 2C), such as a refrigerated unit or another suitable cooling apparatus. The post-cure cycle 140 further comprises step 146 of remove the cured composite structure from the heating apparatus 88. The removal of the cured composite structure 26 may be accomplished with a removal apparatus 148 (see FIG. 2C), such as heat protective hand mits or protective tongs. As shown in FIG. 2C, the post-cure cycle 140 may further comprise step 150 of finishing operations such as machining 152, bonding 154, or coating 156 the cured composite structure 26.

Thus, the method 30 (see FIG. 1) and system 50 (see FIGS. 2A-2C) provide an additive 54 that is added to the resin material 56 of the autoclave 90 or oven 92 cured composite prepreg material 70. The additive 54 preferably undergoes the additive liquid to gas phase transition 62 (see FIG. 2B) above the intended resin cure temperature 66 of the resin material 56 of the composite structure 26 at the cure vacuum pressure 94. During the cure cycle 84, when the composite structure 26 is ordinarily held at a temperature for a significant length of time, when a decreased resin viscosity 106 (see FIG. 2B) is at a near minimum resin viscosity 108 (see FIG. 2B) and the resin material 56 has not yet gelled, the heat of the composite structure 26 is temporarily increased to an increased temperature 113 above the additive phase transition temperature 64 and above the resin cure temperature 66. The additive 54 undergoes an additive liquid to gas phase transition 62, increasing its volume hundreds-fold. This new additive gas 116 displaces or pushes other existing one or more gases 118 (see FIG. 2B) comprising entrapped air and volatiles, including absorbed moisture, dissolved water, resin outgases, or another resin by-product, gaseous reaction products, or other suitable gases out of the composite structure 26. At a decreased mass rate 122 (see FIG. 2B) of the additive outgassing, the heat reduction step 120 reduces the heat and the increased temperature 113 back down to the resin cure temperature 66 in order to drive an additive gas 116 to undergo a phase transition to a condensed phase 127 or an additive gas to liquid phase transition 126 (see FIG. 2B). This substantially decreases or reduces the vacuum pressure 94 in voids 130 (see FIG. 2B) and gas channels 132 (see FIG. 2B), causing collapse of the voids 130 and the gas channels 132 to occur much more rapidly and completely, thus, in turn, causing a reduction in the net void content 136, or porosity 134, in the composite structure 26. As an added benefit, the increased ratio of external pressure to internal pressure 138 (see FIG. 2B) provides for processing of the composite structure 26 out of the autoclave 90, such as in an oven 92.

In another embodiment of the disclosure, the method 30 (see FIG. 1) reduces porosity 134 (see FIG. 2B) in an aircraft composite part 28 (see FIG. 2A). The method 30 comprises step 32 of adding an additive 54 (see FIG. 2A) to a resin material 56 (see FIG. 2A) to form an additive-resin mixture 58 (see FIG. 2A). The additive 54 comprises a phase transition material 60 (see FIG. 2A) having an additive phase transition temperature 64 (see FIG. 2A) greater than a resin cure temperature 66 (see FIG. 2A) of the resin material 56. Preferably, the additive 54 is a phase transition material 60 including alkanes having nine or more carbon atoms with a boiling point at one atmosphere pressure at a temperature in a range of from about 250° F. (degrees Fahrenheit) to about 950° F.; phenylpropenes with a boiling point at one atmosphere at a temperature in a range of from about 392° F. to about 500° F.; polycyclic aromatic hydrocarbons with a boiling point at one atmosphere pressure at a temperature in a range from about 422° F. to about 980° F.; and triacylglycerides as discussed above, or another suitable additive. Preferably, the resin material 56 includes epoxy resins, epoxy amine resins, polyimide resins, bismaleimide resins, phenolic resins, silicone resins, and a combination thereof.

The method 30 for reducing the porosity 134 (see FIG. 2B) in the aircraft composite part 28 further comprises combining the additive-resin mixture 58 with a plurality of reinforcement fibers 68, preferably a plurality of reinforcement carbon fibers, to form a composite prepreg material 70 (see FIG. 2A). The method further comprises laying up the composite prepreg material 70 via a forming process 78 comprising a manual layup 80 or an automated layup, such as with a layup machine 76 (see FIG. 2A), and forming the composite prepreg material 70 into an aircraft composite part 28. The method further comprises surrounding the aircraft composite part 28 under a vacuum bag 98 (see FIG. 2B) under a vacuum pressure 94 (see FIG. 2B). The method 30 further comprises step 38 of heat curing in a heating apparatus 88 comprising an autoclave 90 or an oven 92, the aircraft composite part 28 surrounded under the vacuum bag 98 at an effective vacuum pressure 94, for an effective time period, to the resin cure temperature 66 sufficient to achieve a decreased resin viscosity 106 (see FIG. 2B) of the resin material 56. The method 30 further comprises maintaining 104 (see FIG. 2B) the resin cure temperature 66 for an effective resin cure time period. The method 30 further comprises step 40 of heating the aircraft composite part 28 to an increased temperature 113 (see FIG. 2B) in a range of from about 5 degrees Fahrenheit to about 20 degrees Fahrenheit above the additive phase transition temperature 64 and above the resin cure temperature 66. The method further comprises step 114 of maintaining the increased temperature 113 for a time period sufficient for the additive 54 to undergo a phase transition and to form an additive gas 116 (see FIG. 2B) that substantially displaces one or more gases 118 (see FIG. 2B) out of the aircraft composite part 28. The method 30 further comprises step 42 of reducing the increased temperature 113 back down to the resin cure temperature 66 to allow the additive gas 116 to undergo a phase transition to a condensed phase 127 (see FIG. 2B), resulting in a substantially reduced vacuum pressure 94 in the aircraft composite part 28, and resulting in a reduction in the porosity 134 of the aircraft composite part 28 in a range of from about 80% to about 99% reduction in the porosity. The method 30 further comprises step 44 of cooling the composite structure 26, preferably, the aircraft composite part 28. The method further comprises removing the cooled aircraft composite part out of the autoclave 90.

In another embodiment of the disclosure, as discussed above, there is provided a system 50 (see FIGS. 2A-2C) for reducing the porosity 134 (see FIG. 2B) in a composite structure 26 (see FIG. 2A). The system 50 comprises a composite prepreg material 70 (see FIG. 2A). The composite prepreg material 70 comprises a plurality of reinforcement fibers 68 (see FIG. 2A), preferably a plurality of reinforcement carbon fibers, preimpregnated with an additive-resin mixture 58 (see FIG. 2A). The additive 54 (see FIG. 2A) of the additive-resin mixture 58 comprises a phase transition material 60 (see FIG. 2A) having an additive phase transition temperature 64 (see FIG. 2A) greater than a resin cure temperature 66 (see FIG. 2A) of the resin material 58. Preferably, the additive 54 comprises a phase transition material 60 including the components and compositions discussed in detail above with regard to the method 30. Preferably, the resin material 56 includes epoxy resins, epoxy amine resins, polyimide resins, bismaleimide resins, phenolic resins, silicone resins, a combination thereof, or another suitable resin.

The system 50 further comprises a forming apparatus 74 (see FIG. 2A) comprising a layup machine 76 (see FIG. 2A)

adapted to layup the composite prepreg material 70 into a composite structure 26 (see FIG. 2A). The system 50 further comprises a vacuum device 96 (see FIG. 2B) comprising a vacuum bag 98 (see FIG. 2B). The vacuum device 96 is adapted to surround or cover the composite structure 26 under vacuum at an effective vacuum pressure 94 (see FIG. 2B).

The system 50 further comprises a heating apparatus 88 (see FIG. 2B) comprising an autoclave 90 (see FIG. 2B) or an oven 92 (see FIG. 2B). The heating apparatus 88 is adapted to heat cure the composite structure 26 surrounded by the vacuum device 96 to an effective resin cure temperature 66 and to maintain the resin cure temperature 66 for an effective time period sufficient to achieve a decreased resin viscosity 106 (see FIG. 2B) of the resin material 58. The heating apparatus 88 is further adapted to heat the composite structure 26 to an increased temperature 113 (see FIG. 2B) above the additive phase transition temperature 64 and above the resin cure temperature 66 and to maintain the increased temperature 113 for a time period sufficient for the additive 54 to undergo a phase transition and to form an additive gas 116 (see FIG. 2B) that substantially displaces one or more gases 118 (see FIG. 2B) out of the composite structure 26. The heating apparatus 88 is further adapted to reduce the increased temperature 113 back down to the resin cure temperature 66 to allow the additive gas 116 to undergo a phase transition to a condensed phase 127 (see FIG. 2B), resulting in a substantially reduced vacuum pressure 94 in the composite structure 26, and resulting in a reduction in the porosity 134 (see FIG. 2B) of the composite structure 26. Preferably, the increased temperature 113 is in a range of from about 5 degrees Fahrenheit to about 20 degrees Fahrenheit above the resin cure temperature 66 and preferably about 5 degrees Fahrenheit to about 10 degrees Fahrenheit above the additive phase transition temperature 64, and more preferably, about 5 degrees Fahrenheit above the additive phase transition temperature 64. Preferably, the reduction in the porosity 134 of the composite structure 26 is in a range of from about 80% to about 99% porosity reduction 135 (see FIG. 2B).

Figure 3:
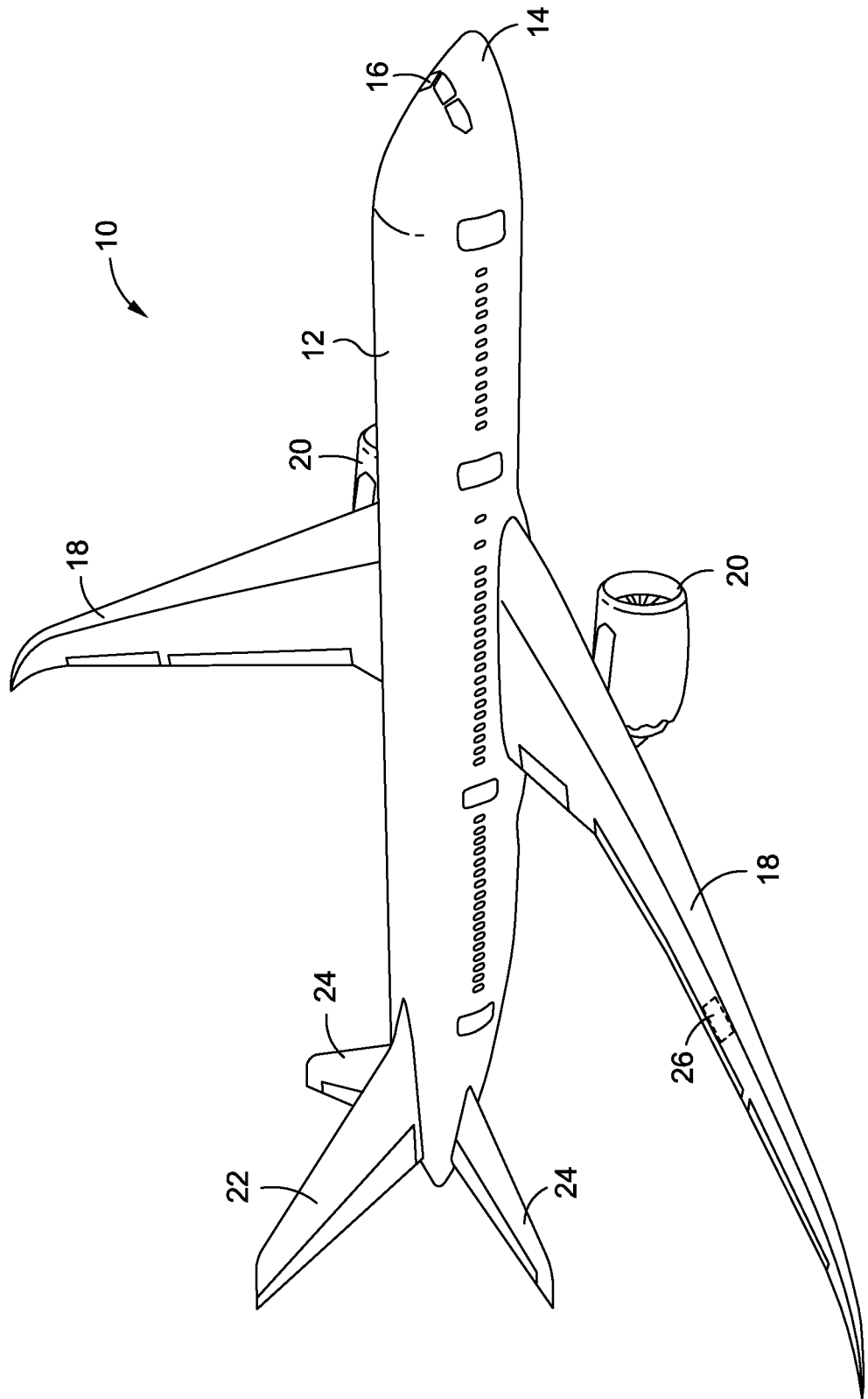

FIG. 3 is an illustration of a perspective view of an exemplary aircraft 10 that may incorporate a composite structure 26 made by one of the embodiments of the method 30 (see FIG. 1) of the disclosure. As shown in FIG. 3, the aircraft 10 comprises a fuselage 12, a nose 14, a cockpit 16, wings 18, one or more propulsion units 20, a vertical tail portion 22, and horizontal tail portions 24. Preferably, the composite structure 26 is an aircraft composite part 28. Although the aircraft 10 shown in FIG. 3 is generally representative of a commercial passenger aircraft having one or more composite structures 26, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable vehicles or items having composite structures.

As will be appreciated by those skilled in the art, incorporating the additive 54 into the composite prepreg material 70 used to form the composite structure 26 results in a number of substantial benefits. Disclosed embodiments of the method 30 (see FIG. 1) and the system 50 (see FIGS. 2A-2C) do not require any significant changes to the composite structure manufacturing process, and in particular, preferably do not require after the forming of the composite prepreg material into the composite structure, that the composite structure, for example, a large composite structure, undergo a lengthy (e.g., 12-24 hours or more) pre-cure vacuum hold under a vacuum pressure. Eliminating such pre-cure vacuum hold may decrease the overall manufacturing process time, and may thus decrease the overall cost of manufacturing, and in particular, may decrease the overall cost of manufacturing large composite parts.

In addition, no additional time is added to the overall cure cycle 84 with the second heat step 110 (see FIG. 2B) of increasing the heat of the composite structure 26 to the increased temperature 113 and maintaining the increased temperature 113 for a time period sufficient for the additive 54 to undergo an additive liquid to gas phase transition 62 and to form an additive gas 116 that substantially displaces one or more gases 118 out of the composite structure 26. Further, disclosed embodiments of the method 30 (see FIG. 1) and the system 50 (see FIGS. 2A-2C) provide a method 30 and a system 50 that preferably reduces the porosity 134, or the void content 136 (see FIG. 2B), during manufacture of the composite structure 26, in a range of from about 80% to about 99% porosity reduction 135, or void content reduction 137 (see FIG. 2B). Such porosity and void reduction or mitigation may result in overall low porosity levels or low void content, e.g., less than 2%, that in turn, allow for the manufacture of composite structures 26, such as aircraft composite parts 28, having improved mechanical properties, such as shear strength, and improved performance. This may result in a decreased rejection of non-conforming composite structures or parts, due to processing issues, oversights, or errors, and in turn, may result in decreased manufacturing costs and decreased costs associated with having to manufacture additional or replacement composite structures or parts.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method to reduce porosity in a composite structure, the method comprising:

adding an additive to a resin material to form an additive-resin mixture, the additive comprising a phase transition material having an additive phase transition temperature greater than a resin cure temperature of the resin material;

combining the additive-resin mixture with a plurality of reinforcement fibers to form a composite prepreg material;

forming the composite prepreg material into a composite structure;

heat curing the composite structure in a heating apparatus under a vacuum device at an effective vacuum pressure for an effective time period at the resin cure temperature sufficient to decrease a viscosity of the resin material;

heating the composite structure to an increased temperature above the additive phase transition temperature and above the resin cure temperature and maintaining the increased temperature for a time period sufficient for the additive to undergo a phase transition and to form an additive gas that substantially displaces one or more gases out of the composite structure;

reducing the increased temperature back down to the resin cure temperature to allow the additive gas to undergo a phase transition to a condensed phase, resulting in a substantially reduced vacuum pressure in the composite structure, and resulting in a reduction in porosity of the composite structure; and, cooling the composite structure.

2. The method of claim 1 wherein the adding the additive to the resin material further comprises adding an additive selected from the group consisting of alkanes having nine or more carbon atoms with a boiling point at one atmosphere pressure at a temperature in a range of from about 250° F. (degrees Fahrenheit) to about 950° F.; phenylpropenes with a boiling point at one atmosphere at a temperature in a range of from about 392° F. to about 500° F.; and polycyclic aromatic hydrocarbons with a boiling point at one atmosphere pressure at a temperature in a range from about 422° F. to about 980° F.; and triacylglycerides.

3. The method of claim 1 wherein the adding the additive to the resin material further comprises adding the additive in an amount of 0.01 volume percent to about 1.5 volume percent based on a total volume of the additive-resin mixture.

4. The method of claim 1 wherein the adding the additive to the resin material further comprises adding the additive to a resin material selected from the group consisting of epoxy resins, epoxy amine resins, polyimide resins, bismaleimide resins, phenolic resins, silicone resins, and a combination thereof.

5. The method of claim 1 wherein the forming the composite prepreg material into the composite structure further comprises laying up the composite prepreg material via a forming process comprising a manual layup or an automated layup with a layup machine.

6. The method of claim 1 wherein the heat curing the composite structure further comprises heat curing the composite structure in a heating apparatus comprising an autoclave or an oven.

7. The method of claim 1 wherein the heat curing the composite structure further comprises heat curing the composite structure under a vacuum device comprising a hermetically sealed flexible vacuum bag.

8. The method of claim 1 wherein the heating the composite structure to the increased temperature further comprises heating the composite structure to an increased temperature in a range of from about 5 degrees Fahrenheit to about 20 degrees Fahrenheit above the resin cure temperature and the additive phase transition temperature.

9. The method of claim 1 wherein the heating the composite structure to the increased temperature above the additive phase transition temperature further comprises maintaining the increased temperature for a time period in a range of from about one minute to about fifteen minutes.

10. The method of claim 1 wherein the heating the composite structure to the increased temperature above the additive phase transition temperature further comprises forming the additive gas that substantially displaces one or more gases, the one or more gases comprising entrapped air and volatiles including absorbed moisture, dissolved water, and resin outgases.

11. A method to reduce a porosity in an aircraft composite part, the method comprising:

adding an additive to a resin material to form an additive-resin mixture, the additive comprising a phase transition material having an additive phase transition temperature greater than a resin cure temperature of the resin material;

combining the additive-resin mixture with a plurality of reinforcement carbon fibers to form a composite prepreg material;

laying up the composite prepreg material via a forming process comprising a manual layup or an automated layup;

surrounding the aircraft composite part under a vacuum bag under a vacuum pressure;

heat curing in a heating apparatus comprising an autoclave or an oven, the aircraft composite part surrounded under the vacuum bag at an effective vacuum pressure, for an effective time period, to the resin cure temperature sufficient to decrease a viscosity of the resin material;

maintaining the resin cure temperature for an effective resin cure time period;

heating the aircraft composite part to an increased temperature in a range of from about 5 degrees Fahrenheit to about 20 degrees Fahrenheit above the additive phase transition temperature and above the resin cure temperature;

maintaining the increased temperature for a time period sufficient for the additive to undergo a liquid to gas phase transition and to form an additive gas that substantially displaces one or more gases out of the aircraft composite part;

reducing the increased temperature back down to the resin cure temperature to allow the additive gas to undergo a phase transition to a condensed phase, resulting in a substantially reduced vacuum pressure in the aircraft composite part, and resulting in a reduction in a porosity of the aircraft composite part;

cooling the aircraft composite part; and, removing the cooled aircraft composite part out of the autoclave.

12. The method of claim 11 wherein adding the additive to the resin material further comprises adding an additive selected from the group consisting of alkanes having nine or more carbon atoms with a boiling point at one atmosphere pressure at a temperature in a range of from about 250° F. (degrees Fahrenheit) to about 950° F.; phenylpropenes with a boiling point at one atmosphere at a temperature in a range of from about 392° F. to about 500° F.; and polycyclic aromatic hydrocarbons with a boiling point at one atmosphere pressure at a temperature in a range from about 422° F. to about 980° F.; and triacylglycerides.

13. The method of claim 11 wherein the adding the additive to the resin material further comprises adding the additive to a resin material selected from the group consisting of epoxy resins, epoxy amine resins, polyimide resins, bismaleimide resins, phenolic resins, silicone resins, and a combination thereof.

* * * * *